(12) United States Patent
Siepierski et al.

(10) Patent No.: US 6,830,842 B2
(45) Date of Patent: Dec. 14, 2004

(54) HYDROGEN PURGED MOTOR FOR ANODE RE-CIRCULATION BLOWER

(75) Inventors: James S. Siepierski, Williamsville, NY (US); Ulrich Dumke, Ruesselsheim (DE)

(73) Assignee: General Motors Corporation, Detroit, MI (US)

( * ) Notice: Subject to any disclaimer, the term of this patent is extended or adjusted under 35 U.S.C. 154(b) by 513 days.

(21) Appl. No.: 10/003,869

(22) Filed: Oct. 24, 2001

(65) Prior Publication Data

US 2003/0077499 A1 Apr. 24, 2003

(51) Int. Cl.[7] .............................................. H01M 8/04
(52) U.S. Cl. ........................................ 429/17; 429/35
(58) Field of Search ............................. 429/17, 35, 36, 429/37

(56) References Cited

U.S. PATENT DOCUMENTS 4,075,396 A * 2/1978 Grehier ...................... 429/17
4,769,297 A * 9/1988 Reiser et al. ................ 429/17
2002/0098393 A1 * 7/2002 Dine et al. ................. 429/17 X
2002/0142208 A1 * 10/2002 Keefer et al. ............. 429/17 X
2004/0023084 A1 * 2/2004 Sterchi et al. ................ 429/13

* cited by examiner

Primary Examiner—Stephen J. Kalafut
(74) Attorney, Agent, or Firm—Cary W. Brooks

(57) ABSTRACT

A fuel cell system that can be used to power a vehicle is disclosed. The system includes a fuel cell stack, which uses hydrogen and an oxidizer to generate electricity, and a re-circulation loop that returns unreacted hydrogen to the fuel cell stack. The system includes a hermetically sealed assembly having a blower portion that pressurizes hydrogen in the re-circulation loop and a motor portion that drives the blower. The system also includes a source of make-up hydrogen for replenishing hydrogen in the re-circulation loop. The source introduces make-up hydrogen in the motor portion of the assembly at a pressure greater than the pressure in the blower portion of the assembly. Consequently, make-up hydrogen flows from the motor portion of the assembly into the blower portion assembly where it mixes with components in the re-circulation loop. A method of replenishing hydrogen in the fuel cell stack is also disclosed.

20 Claims, 2 Drawing Sheets

HYDROGEN PURGED MOTOR FOR ANODE RE-CIRCULATION BLOWER

TECHNICAL FIELD

This invention relates generally to fuel cell systems, and more particularly to an apparatus and method for recycling hydrogen fuel gas to a fuel cell stack.

BACKGROUND OF THE INVENTION

A fuel cell is a device that converts chemical energy directly into electrical energy and heat. In perhaps its simplest form, a fuel cell comprises two electrodes—an anode and a cathode—separated by an electrolyte. During use, the anode is supplied with fuel and the cathode is supplied with an oxidizer, which is usually oxygen in ambient air. With the aid of a catalyst, the fuel undergoes oxidation at the anode, producing protons and electrons. The protons diffuse through the electrolyte to the cathode where, in the presence of a second catalyst, they combine with oxygen and electrons to produce water and heat. Because the electrolyte acts as a barrier to electron flow, the electrons travel from the anode to the cathode via an external circuit containing an electrical load that consumes power generated by the fuel cell. A fuel cell generates an electrical potential of about one volt or less, so individual fuel cells are "stacked" in series to achieve a requisite voltage.

Because of their high efficiency, their potential for fuel flexibility, and their ability to generate electricity with zero or near zero emission of pollutants, fuel cells have been proposed as replacements for internal combustion engines in vehicles. Among fuels that have been considered for vehicle applications, hydrogen ($H_2$) appears to be the most attractive. Hydrogen has excellent electrochemical reactivity, provides sufficient power density levels in an air-oxidized system, and produces only water upon oxidation.

FIG. 1 schematically shows a hydrogen-based fuel cell system 10. The fuel cell system 10 includes a fuel cell stack 12, which is made up of individual fuel cells 14 and includes cathode 16 and anode 18 terminals that are electrically connected via an external circuit 20. The external circuit 20 includes a load 22 (e.g., electrical motor) which consumes power generated by the fuel cell stack 12. Air (oxygen) and pressurized hydrogen enter the fuel cell stack 12 through cathode 24 and anode 26 gas inlets, respectively. The fuel cell stack 12 includes internal flow paths 28, 30, which distribute air and hydrogen to the cathode and anode of each fuel cell 14. Oxygen-depleted air exits the fuel cell stack 12 through a cathode gas outlet 32. Water, nitrogen, and unreacted hydrogen exit the fuel stack 12 through an anode gas outlet 34.

As shown in FIG. 1, a first conduit 36 carries the anode gases ($H_2$, $N_2$, and $H_2O$) away from the fuel cell stack 12. A portion of the anode gas stream may vent into an exhaust line 38 through a draw-off valve 40; a recycle line 42 returns the balance of the anode gas stream to the fuel cell stack 12. Besides pressure losses from anode gas venting, frictional losses within the anode gas flow path 30 typically result in about a thirty kPa pressure drop across the fuel cell stack 12. To overcome these pressure losses, the fuel cell system 10 employs a motor 44 driven blower 46 to boost the pressure of the anode gas within the recycle line 42. For clarity, the motor 44 and blower 46 are depicted without an enclosure to show that a rigid shaft 48 transmits torque between the motor 44 and blower 46. Furthermore, as indicated by an arrow 50, a dynamic seal 52 reduces, but may not eliminate the flow of the anode gas from the blower 46 to the motor 44.

Pressurized anode re-circulation gas exits the blower 46 through an outlet 54 and flows into a discharge line 56, which directs the anode gas recycle stream into the anode gas inlet 26 of the fuel cell stack 12. A second conduit 58, which communicates with a hydrogen gas reservoir 60 or other source of hydrogen, introduces make-up hydrogen into the blower discharge line 56. A control valve 62 and a mass flow meter 64, which communicate with a flow controller (not shown), regulate the amount of hydrogen added to the anode gas re-circulation stream. During operation, a heat exchanger 66 removes excess heat generated by the blower motor 44. The heat exchanger 66 typically comprises a fluid coolant loop 68, which circulates the fluid coolant through the motor 44 housing.

Although the fuel cell system 10 shown in FIG. 1 represents a useful scheme, existing motor 44 driven blowers 46 for fuel cell applications present several difficulties. Because hydrogen is a small molecule, the dynamic seal 52 may be unable to completely prevent $H_2$ from leaking into the blower motor 44 air space. In addition, water in the anode gas re-circulation stream may leak into the motor 44 housing, which may contaminate the motor lubricant and promote corrosion of motor parts. Finally, since the motor 44 generates a substantial amount of heat, a relatively large heat exchanger 66 must be used, which adds to the bulk and expense of the fuel cell system 10.

The present invention overcomes, or at least helps mitigate, one or more of the problems set forth above.

SUMMARY OF THE INVENTION

The present invention provides a fuel cell system that can be used to power a vehicle. The system includes a fuel cell stack, which uses hydrogen and an oxidizer (typically oxygen in ambient air) to generate electricity. The system includes a re-circulation loop for returning unreacted hydrogen, along with water and nitrogen, to the fuel cell stack, and a hermetically sealed assembly, which comprises a blower portion for pressurizing hydrogen in the re-circulation loop and a motor portion for driving the blower.

The system also includes a source of make-up hydrogen for replenishing hydrogen in the re-circulation loop. The source introduces make-up hydrogen in the motor portion of the assembly at a pressure greater than the pressure in the blower portion of the assembly. As a result, at least some of the make-up hydrogen flows from the motor portion of the assembly into the blower portion assembly, which helps prevent components in the re-circulation loop from entering the motor portion of the assembly. Make-up hydrogen purges the motor of undesirable compounds (e.g., water and oxygen) and removes heat generated by the motor and controller (if present). Passing make-up hydrogen through the blower portion of the assembly preheats the make-up hydrogen and, in some cases, obviates the need for a separate heat exchanger.

The present invention also provides an apparatus for replenishing hydrogen in a fuel cell stack. The apparatus includes a re-circulation loop for returning unreacted hydrogen to the fuel cell stack, and a hermetically sealed assembly comprising a blower portion and a motor portion. The blower portion of the assembly, which communicates with the re-circulation loop, pressurizes hydrogen in the re-circulation loop, and the motor portion of the assembly drives the blower. The apparatus includes a source of make-up hydrogen, which is adapted to introduce hydrogen in the motor portion of the assembly at a pressure greater than the pressure in the blower portion of the assembly.

Finally, the present invention provides a method of replenishing hydrogen in a fuel cell stack. The method comprises re-circulating unreacted hydrogen from an outlet to an inlet of the fuel cell stack using a motor-driven blower. The motor, which is hermetically coupled to the blower, has a flow path that provides fluid communication between the motor and the blower. The method thus includes introducing make-up hydrogen in the motor at a pressure higher than the pressure in the blower. Make-up hydrogen flows within the motor and through the flow path into the blower where it mixes with unreacted hydrogen.

DESCRIPTION OF THE PREFERRED EMBODIMENT

Figure 1:
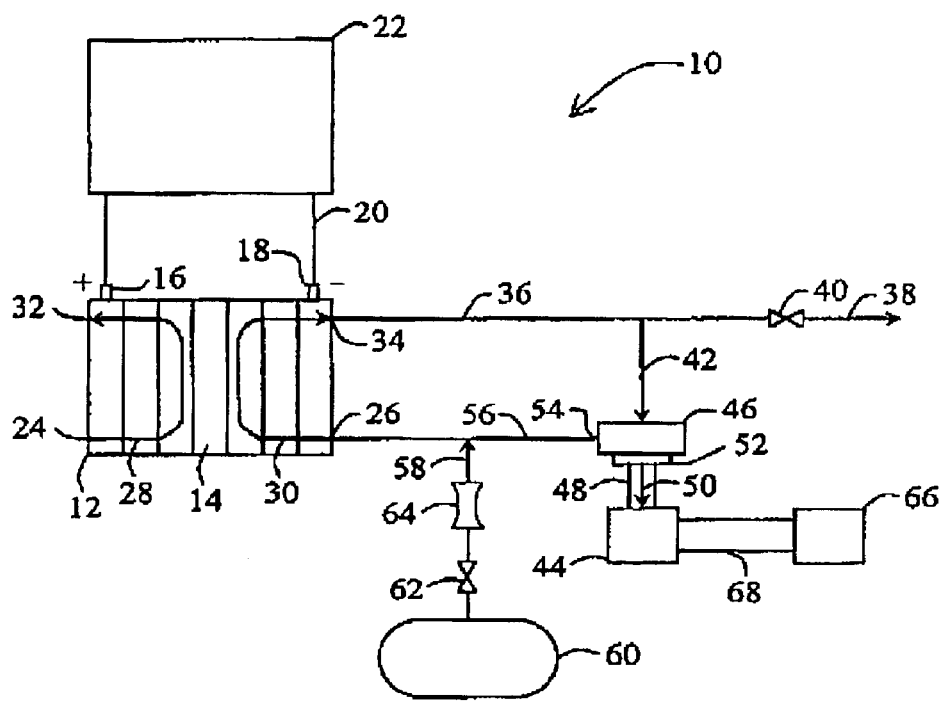
FIG. 1 shows a hydrogen-based fuel cell system.
Figure 2:
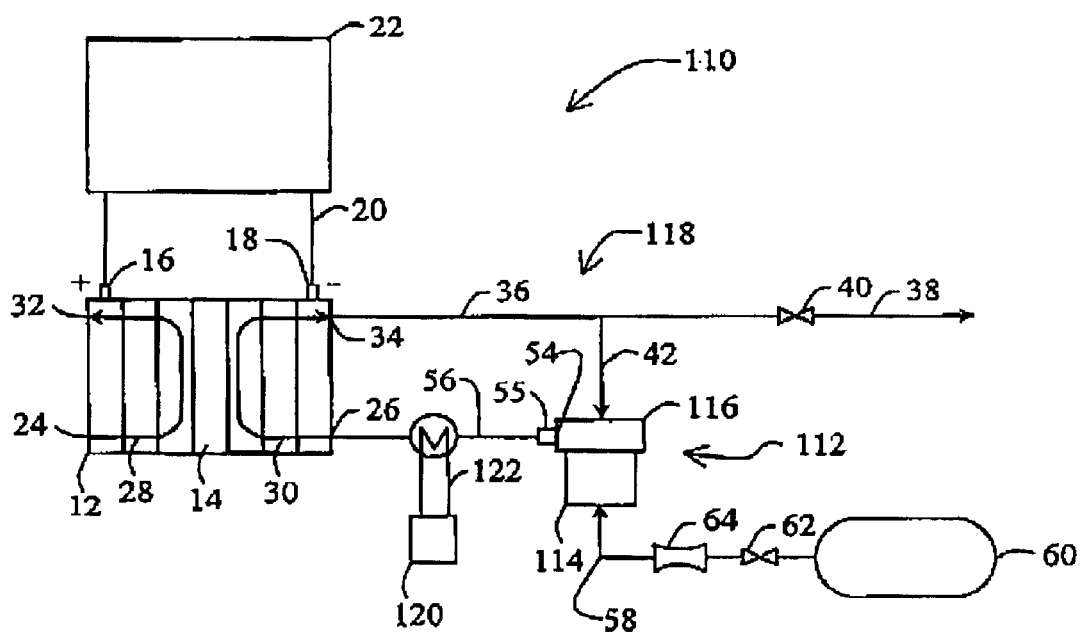
FIG. 2 shows a fuel cell system employing a hermetically sealed hydrogen-purged motor and blower assembly for anode gas re-circulation.

FIG. 2 shows a fuel cell system 110 employing a hermetically sealed motor and blower assembly 112. The fuel cell system 110 is similar to the system 10 shown in FIG. 1, and includes many of the same elements. For example, the fuel cell system 110 includes a fuel cell stack 12, which is made up of individual fuel cells 14 and includes cathode 16 and anode 18 terminals that are electrically connected via an external circuit 20. The external circuit 20 includes a load 22 (e.g., electrical motor) which consumes power generated by the fuel cell stack 12.

Moist air (oxygen, nitrogen, de-ionized water) and pressurized hydrogen enter the fuel cell stack 12 through cathode 24 and anode 26 gas inlets, respectively. The fuel cell stack 12 includes internal flow paths 28, 30, which distribute air and hydrogen to the cathode and anode of each fuel cell 14. Oxygen-depleted air exits the fuel cell stack 12 through a cathode gas outlet 32, and water, nitrogen and unreacted hydrogen exit the fuel cell stack 12 through an anode gas outlet 34. A first conduit 36 carries the anode gases ($H_2$, $N_2$, and $H_2O$) away from the fuel cell stack 12. A portion of the anode gas stream may vent into an exhaust line 38 through a draw-off valve 40; a recycle line 42 returns the balance of the anode gas stream to the fuel cell stack 12.

To achieve the requisite gas pressure at the anode gas inlet 26, the fuel cell system 110 employs a hermetically sealed motor and blower assembly 112. The motor and blower assembly 112 includes a hydrogen-purged motor portion 114 that is coupled to a blower 116 or compressor, which boosts the pressure of the anode gas within the recycle line 42. Although compressors and blowers generally refer to gas handling devices having, respectively, minimum or maximum compression ratios of about 1.1, the present disclosure uses the two terms interchangeably. A second conduit 58, which communicates with a hydrogen gas reservoir 60 or other source of hydrogen, introduces fresh hydrogen (e.g., 99.9% purity) into the motor portion 114 of the assembly 112. The hydrogen gas pressure within the motor portion 114 of the assembly 112 is greater than the pressure of the anode re-circulation gas passing through the blower 116. As a result, make-up hydrogen flows from the motor portion 114 into the blower portion 116 of the assembly 112, which prevents the flow of anode gas from the recycle line 42 into the motor 114.

Pressurized anode re-circulation gas, which includes make-up hydrogen from the hydrogen reservoir 60, exits the blower 116 through an outlet 54 and an external diffuser 55 and flows into a discharge line 56. The discharge line 56 directs the anode gas stream into the anode gas inlet 26 of the fuel cell stack 12, thereby completing an anode gas re-circulation loop 118. A control valve 62 and a mass flow meter 64, which communicate with a flow controller (not shown) regulate the amount of hydrogen added to the anode gas recycle stream through the motor 114 portion of the motor and blower assembly 112.

Besides minimizing leakage of anode gas into the motor portion 114, the hermetically sealed motor and blower assembly 112 provides additional advantages. For example, because the motor 114 and blower 116 portions are enclosed within a gas-tight can or housing, the assembly 112 runs quieter than the motor 44 and blower 46 shown in FIG. 1. In addition to purging the motor enclosure of undesirable fluids, the make-up hydrogen stream extracts heat generated by the motor, which in many cases, obviates the need for the heat exchanger 66 shown in FIG. 1. Since make-up hydrogen enters the anode gas re-circulation stream through the motor portion 114 of the assembly 112, the motor requires comparatively less windage, resulting in higher motor efficiency.

If the system 110 requires additional heating or cooling to control the temperature of the anode re-circulation gas entering the fuel cell stack 12, it may employ a relatively small heat exchanger 120 located downstream of the blower outlet 54. The optional heat exchanger 120 shown in FIG. 2 includes a heat transfer loop 122. Depending on the temperature of the fluid flowing within the loop 122, the heat exchanger 120 heats or cools the anode re-circulation gas in the blower discharge line 56.

Figure 3:
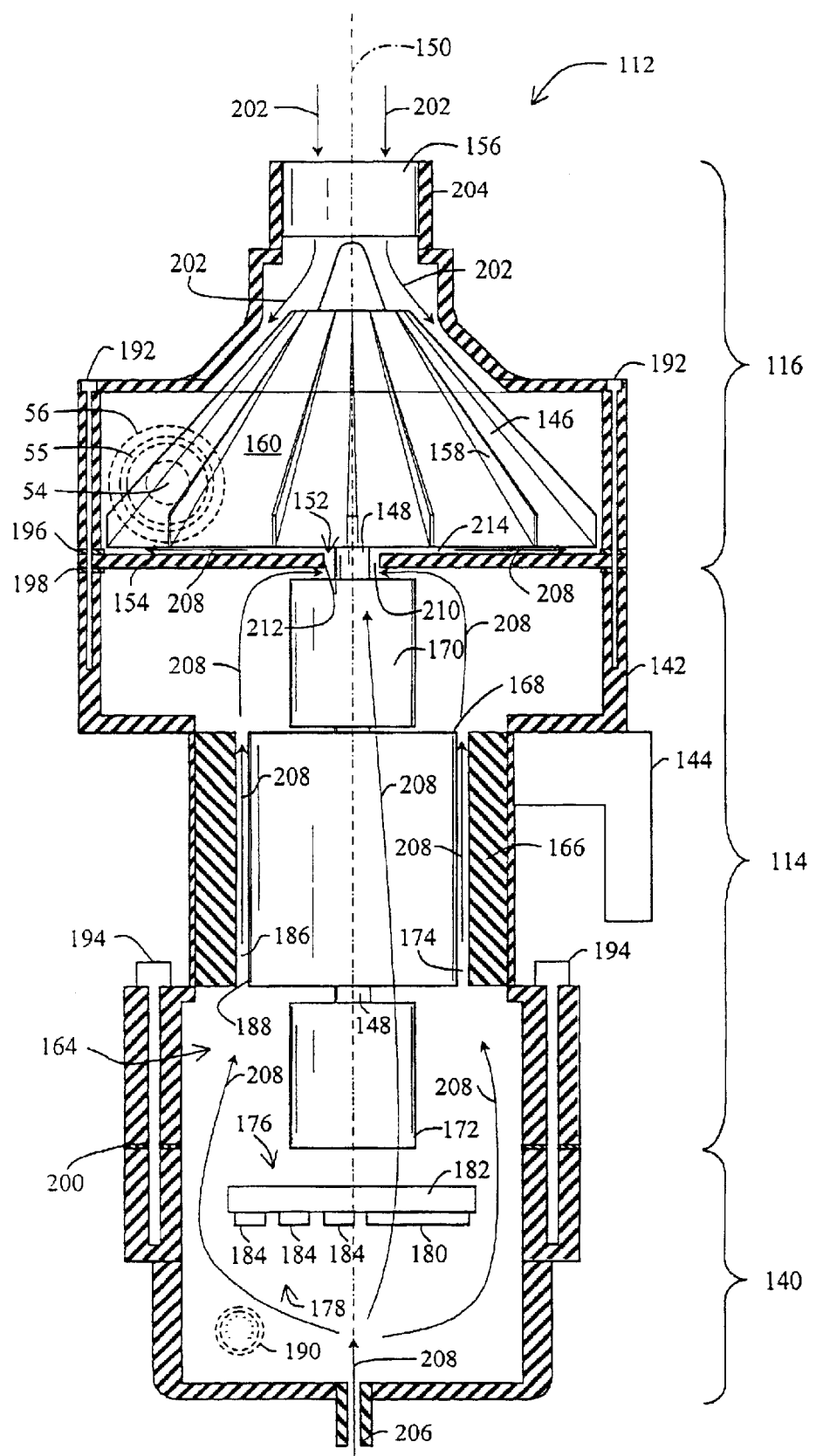
FIG. 3 shows a partial cross-sectional view of the hermetically sealed hydrogen-purged motor and blower of FIG. 2.

FIG. 3 shows a partial cross-sectional view of one embodiment of the hermetically sealed motor and blower assembly 112. The embodiment includes a hydrogen-purged motor portion 114, an anode gas re-circulation blower portion 116, and a motor controller portion 140, which are contained within a gas-tight housing 142. The motor and blower assembly 112 includes a bracket 144 attached to the housing 142 for mounting the assembly 112 on a motor vehicle. For a typical fuel cell-powered engine, the motor and blower housing 142 should have a maximum allowable working pressure of at least about eighty five psig when tested in accordance with ASME Boiler and Pressure Vessel Codes, Section VIII, Div. 1 and 2 (1998).

The assembly 112 shown in FIG. 3 employs a partial emission, centrifugal-type blower 116. Unlike positive displacement gas moving equipment (e.g., rotary pumps), centrifugal blowers possess substantial clearances between moving parts and therefore provide better durability and reliability when exposed to corrosive fluids such as the anode gas. The blower portion 116 of the assembly 112 includes an impeller 146 mounted on a rigid shaft 148, which has a rotation axis 150 indicated by a dotted line in FIG. 3. The shaft 148 runs the length of the motor portion 114 and extends into the blower portion 116 of the assembly 112 through an aperture 152 in an impeller backing plate 154, which separates the motor 114 and the blower 116 portions. The blower 116 includes an optional pump inducer 156 or pre-swirler located immediately upstream of the impeller 146.

The impeller 146 includes blades 158 or vanes, which project outward from the impeller surface 160. The partial emission-type blower 116 shown in FIG. 3 uses straight radial blades 158 on an open impeller 146 and an external diffuser 55, which at any given instant, permits only a fraction of the gas entrained by the blades 158 to exit the blower 116. In contrast, full emission blowers have curved blades and a volute diffuser. The volute diffuser channels gas from all of impeller blades to the blower outlet 54 simultaneously. Though the fuel cell system 110 may use a full emission-type blower, partial emission blowers usually can more easily meet the relatively high pressure and low flow rate requirements of the fuel cell system 110.

The motor portion 114 of the assembly 112 includes a variable frequency AC motor 164. Such motors are brushless, which minimizes sparking and electromagnetic interference, and typically provides for lower maintenance, higher durability, and quieter operation than motors employing brushes. In addition to the rigid shaft 148, the motor 164 shown in FIG. 3 includes a stator 166, rotor 168 and a pair of bearings 170, 172. The stator 166 comprises a generally cylindrical frame with windings located in slots around its inner periphery 174. Although in some embodiments the rotor 168 may include insulated windings, the motor 164 shown in FIG. 3 uses permanent magnets, which obviate the need for slip rings and an external source of DC field current. The permanent magnets, which can be made of neodymium-boron-iron, samarium-cobalt, ferrite, and the like, have polar axes that extend radially outward from the rotation axis of the rotor 168, which coincides with the rotation axis 150 of the rigid shaft 148. The bearings 170, 172 support the rotating shaft 148, and ordinarily should permit motor 164 and impeller 146 speeds up to at least about 40,000 revolutions per minute. Useful bearings 170, 172 include ceramic ball bearings.

The motor controller portion 140 of the motor and blower assembly 112, typically comprises a variable frequency drive (VFD) 176. The VFD 176 includes an inverter 178 and control circuit 180 (e.g., microprocessor) mounted on a heat sink 182. The inverter 178 shown in FIG. 3, includes three pairs of semiconductors 184, such as insulated gate bipolar transistors, metal oxide semiconductor-field effect transistors, bipolar transistors, thyristors, and the like. Under the direction of the control circuit 180, the inverter 178 receives a constant DC voltage (e.g., 300 VDC) from an external power source (i.e., the fuel cell stack 12) and converts it into a variable AC supply that can drive the motor 164 at different speeds. Since the input voltage is constant, the inverter 178 adjusts both the amplitude and the frequency (f) of the current that is fed to the stator 166 windings of the motor 164. The stator 166 current establishes a magnetic field in a gap 186 or annular region between the inner periphery 174 of the stator 166 and the outer periphery 188 of the rotor 168. The magnetic field rotates at $120 \cdot f \cdot p^{-1}$ revolutions per minute—where p is the number of magnetic poles of the rotor—and induces rotation of the rotor 168 and shaft 148 since the permanent magnets on the rotor 168 attempt to align themselves with the rotating magnetic field.

In other embodiments, the VFD 176 may include a rectifier and an intermediate circuit (not shown). The rectifier receives an AC voltage and converts it to a pulsating DC voltage, which is fed to the intermediate circuit, which depending on the type of rectifier and inverter used, stabilizes the DC voltage or converts it to a variable DC current or variable DC voltage. For variable DC current or variable DC voltage, the VFD controller uses, respectively, a current-sourced inverter or an inverter employing pulse-amplitude modulation to generate a variable AC supply that regulates motor 164 speed. Inverters that receive a constant DC voltage input, such as the inverter 178 depicted in FIG. 3, use pulse-width modulation to generate a variable AC supply.

As shown in FIG. 3, the motor and blower assembly 112 also includes a hermetic electrical connector 190, which provides electrical communication between internal components of the motor controller portion 140 and elements of the fuel cell system 110 and vehicle. Suitable connectors 190 include ten pin connectors, such as PAVE-Mate II connectors that are available from PAVE Technologies, Dayton, Ohio. A variety of electrical signals can be routed through the connector, including constant DC voltage inputs for the inverter 178 (e.g., 300 VDC) and the control circuit 180 (12 VDC), as well as controller area network (CAN) data, safety E-stop signal, and software. CAN data input to the motor controller portion 140 includes control signals (e.g., desired motor speed in RPM) and calibration signals. Similarly, CAN data output from the motor controller portion 140 includes status signals (e.g., actual motor speed in RPM) and diagnostic signals (i.e., error codes).

As can be seen in FIG. 3, the motor and blower assembly 112 includes fasteners 192, 194 (e.g., threaded cap screws) for attaching the blower 116 and controller 140 portions of the assembly 112 to the motor portion 114. To minimize fluid leaks, the assembly 112 includes gaskets 196, 198, 200 disposed between adjacent surfaces of the impeller backing plate 154 and the blower portion 116 of the assembly 112, and between adjacent surfaces of the motor portion 116, the backing plate 154, and the controller portion 140. The gaskets 196, 198, 200 include sheets having apertures sized to accommodate internal components of the assembly 112 and to permit passage of the fasteners 192, 194 that extend between adjacent portions 114, 116, 140 of the motor and blower assembly 112. Useful gaskets 196, 198, 200 include sheets of a metal-coated resilient material (e.g., natural or synthetic elastomer) or one or more layers of compliant metal.

Components of the motor and blower assembly 112 should be fabricated from materials that can meet the mechanical, electrical, thermal, and other design requirements of vehicles, including mass, volume, and cost. The materials should also be compatible with the assembly's working environment. For example, the assembly housing 142 should be able to resist attack by compounds present in the engine compartment of the vehicle (e.g., road contaminants). Similarly, the blower 116 components should be able to resist attack by corrosive constituents of the anode gas re-circulation stream, including water, which may condense during startup and shutdown of the fuel cell system 110. Care should also be taken to ensure that assembly 112 components release minimal amounts of certain ions—i.e., chlorine and metal ions—into the anode gas re-circulation stream. In most cases, the assembly 112 should also avoid the use of lubricants that may volatilize at motor and blower 112 operating temperatures. Useful fabrication materials include anodized aluminum, stainless steel, and thermally stable plastic.

During operation of the fuel cell system 110, the anode gas, which is indicated by arrows 202 in FIG. 3, enters the blower portion 116 of the assembly 112 from the recycle line 42 via an inlet port 204 located adjacent to the rotating impeller 146 and optional pump inducer 156. Initially, the anode gas flows along the impeller's rotation axis 150, but under the action of the impeller blades 158 and surface 160, turns and flows radially outward away from the rotation axis 150. The anode gas re-circulates in the block-flow area of the impeller 146 to build high static pressure and then decelerates suddenly after leaving the rotor 168 and entering the diffuser 55 through the blower outlet 54, which converts the kinetic energy of the gas into pressure energy. From the diffuser 55, the pressurized anode gas dumps into the discharge line 56.

The pressurized anode re-circulation gas includes fresh hydrogen from the reservoir 60, which enters the assembly 112 through a port 206 in the motor controller portion 140. As shown by arrows 208 in FIG. 3, the make-up hydrogen initially flows through the interior of the motor controller portion 140. The make-up hydrogen flows past the heat sink 182, where it extracts heat generated by the VFD controller 176 components, including the inverter 178 and the control circuit 180. After exiting the motor controller portion 140, the make-up hydrogen flows through the motor portion 114 of the assembly where the gas extracts heat from the motor 164 components, including the bearings 170, 172, stator 166, and rotor 168. Next, the hydrogen stream enters the blower portion 116 through an annular space 210 or clearance between the rigid shaft 148 and a wall 212 that defines the aperture 152 in the impeller backing plate 154. The make-up hydrogen flows radially outward from the rotation axis 150 within a gap 214 or clearance between the impeller 146 and the backing plate 154. It then mixes with and cools the anode re-circulation gas in the blower 116, and exits the hermetic assembly 112 through the blower outlet 54, the diffuser 55, and the discharge line 56.

Although FIG. 3 shows the make-up hydrogen flowing through the gap 186 between the stator 166 and rotor 168, the motor 164 may include other flow paths. For example, the shaft 148, stator 166, rotor 168, and bearings 170, 172 may each include channels that provide additional flow paths for hydrogen. In the embodiment shown in FIG. 3, the hydrogen inlet port 206 is positioned along the common rotation axis 150 in the motor controller portion 140 of the assembly, but generally can be located anywhere in the motor 114 and controller 140 portions 140. In such cases, the assembly 112 may include baffles or similar structures to direct the make-up hydrogen to various locations within the assembly 112.

In other embodiments, the motor and blower assembly 112 may include a labyrinth seal (not shown) disposed in the annular gap 210 between the wall 212 of the impeller backing plate 154 and the rigid shaft 148. The labyrinth seal comprises a series of knife-edge restrictions that extend from the rigid shaft 148 into the annular gap 210. These close-clearance restrictions reduce, but do not eliminate, the flow of make-up hydrogen from the motor portion 114 into the blower portion 116 of the assembly 112. However, because of the magnitude of the pressure drop across the labyrinth seal, the flow rate of make-up hydrogen through the motor and blower assembly 112 may be insufficient to replenish the anode re-circulation gas stream at the highest loads 22. Thus, the system 110 may include a third conduit (not shown) that communicates with either the hydrogen gas reservoir 60 or the motor portion 114 of the assembly, and which introduces fresh hydrogen into the discharge line 56 downstream of the blower and motor assembly 112. Though more complex than the fuel cell system 110 depicted in FIG. 2—the embodiment would likely require additional mass flow controllers, more piping, and perhaps a larger heat exchanger—the labyrinth seal would further reduce any leakage of anode re-circulation gas into the motor portion 114 of the assembly 112.

Process parameters will depend at least in part on the characteristics of the fuel cell stack 12 and the load 22. For the fuel cell system 110 shown in FIG. 2, the mass flow rate in the blower discharge line 56 typically ranges from about 0.5 g·s$^{-1}$ at idle (1% load) to about 24 g·s$^{-1}$ at peak load, and the absolute pressure ranges from about 112 kPa to about 244 kPa. These flow rates assume that the anode re-circulation gas in the discharge line 56 comprises about 52 mole % hydrogen, about 28 mole % nitrogen, and about 20 mole % water vapor, and correspond to make-up hydrogen mass flow rates ranging from about 0.2 g·s$^{-1}$ to about 1.5 g·s$^{-1}$. To overcome the pressure drop across the assembly 112 and to ensure minimal flow of anode re-circulation gas into the motor portion 114 of the assembly 112, the absolute pressure of hydrogen at the hydrogen inlet port 206 ranges from about 132 kPa (at idle) to about 264 kPa (at peak load). Temperatures of the anode gas in the blower discharge line 56 typically range from about 60° C. to about 85° C. The temperature of the make-up hydrogen that is fed to the motor and blower assembly 112 typically ranges from about −20° C. to about 40° C. (ambient temperature) since the reservoir 60 temperature is ordinarily not controlled.

The above description is intended to be illustrative and not restrictive. Many embodiments and many applications besides the examples provided would be apparent to those of skill in the art upon reading the above description. The scope of the invention should therefore be determined, not with reference to the above description, but should instead be determined with reference to the appended claims, along with the full scope of equivalents to which such claims are entitled. The disclosures of all articles and references, including patent applications and publications, are hereby incorporated by reference in their entirety for all purposes.

What is claimed is:

1. A fuel cell system comprising:
a fuel cell stack utilizing hydrogen and an oxidizer to generate electricity, the fuel cell stack having an inlet for introducing hydrogen and an outlet for removing unreacted hydrogen;
a re-circulation loop for returning unreacted hydrogen to the fuel cell stack, the re-circulation loop providing a flow path between the inlet and the outlet of the fuel cell stack;
a hermetically sealed assembly comprising a blower portion for pressurizing hydrogen in the re-circulation loop and a motor portion for driving the blower, the blower portion of the assembly in fluid communication with the re-circulation loop; and
a source of make-up hydrogen, the source adapted to introduce make-up hydrogen into the motor portion of the assembly at a pressure greater than the pressure in the blower portion of the assembly.

2. The fuel cell system of claim 1, further comprising an exhaust line for venting a portion of the unreacted hydrogen from the re-circulation loop.

3. The fuel cell system of claim 1, wherein the re-circulation loop includes a conduit that provides a flow path between the outlet of the fuel cell stack and an inlet of the blower portion of the assembly.

4. The fuel cell system of claim 3, wherein the re-circulation loop further comprises a discharge line, the discharge line providing a flow path between an outlet of the blower portion of the assembly and the inlet of the fuel cell stack.

5. The fuel cell system of claim 1, further comprising a conduit that provides fluid communication between the motor portion of the assembly and the source of make-up hydrogen.

6. The fuel cell system of claim 1, further comprising a wall separating the motor and blower portions of the assembly, the wall having an aperture that allows make-up hydrogen to flow from the motor portion of the assembly into the blower portion of the assembly.

7. The fuel cell system of claim 1, further comprising a conduit that provides a flow path between the motor portion of the assembly and the re-circulation loop.

8. An apparatus for replenishing hydrogen in a fuel cell stack, the fuel cell stack having an inlet for introducing hydrogen and an outlet for removing unreacted hydrogen, the apparatus comprising:
- a re-circulation loop for returning unreacted hydrogen to the fuel cell stack, the re-circulation loop providing a flow path between the inlet and the outlet of the fuel cell stack;
- a hermetically sealed assembly comprising a blower portion for pressurizing hydrogen in the re-circulation loop and a motor portion for driving the blower, the blower portion of the assembly in fluid communication with the re-circulation loop; and
- a source of make-up hydrogen, the source adapted to introduce hydrogen into the motor portion of the assembly at a pressure greater than the pressure in the blower portion of the assembly.

9. The fuel cell system of claim 8, further comprising an exhaust line for venting a portion of the unreacted hydrogen from the re-circulation loop.

10. The apparatus of claim 9, wherein the assembly further comprises controller portion for regulating the motor, the controller portion in fluid communication with the motor portion of the assembly.

11. The apparatus of claim 10, further comprising a conduit that provides a flow path between the source of make-up hydrogen and the controller portion of the assembly.

12. The apparatus of claim 11 wherein the controller portion of the assembly includes a variable frequency drive.

13. The apparatus of claim 8, wherein the blower portion of the assembly is a partial emission-type blower.

14. The apparatus of claim 8, wherein the motor portion of the assembly includes a brushless AC motor.

15. The apparatus of claim 8, wherein the assembly further comprises a wall separating the motor and blower portions of the assembly, the wall having an aperture that provides a flow path for make-up hydrogen flowing from the motor portion of the assembly into the blower portion of the assembly.

16. The apparatus of claim 15, wherein the assembly further comprises a rigid shaft extending from the motor portion of the assembly into the blower portion of the assembly through the aperture in the wall separating the motor and blower portions of the assembly, the rigid shaft providing mechanical coupling between the blower portion of the assembly and the motor portion of the assembly.

17. The apparatus of claim 16, wherein the assembly includes a labyrinth seal disposed in the aperture between the wall and the rigid shaft.

18. The apparatus of claim 8, further comprising a conduit that provides a flow path between the motor portion of the assembly and the re-circulation loop.

19. A method of replenishing hydrogen in a fuel cell stack, the fuel cell stack hiving an inlet for introducing hydrogen and an outlet for removing unreacted hydrogen, the method comprising:
- re-circulating unreacted hydrogen from the outlet of the fuel cell stack to the inlet of the fuel cell stack using a blower;
- driving the blower using a motor, the motor hermetically coupled to the blower and having a flow path that provides fluid communication between the motor and the blower; and
- introducing make-up hydrogen into the motor at a pressure higher than the pressure in the blower so that make-up hydrogen flows from the motor into the blower through the flow path.

20. The method of claim 19, further comprising:
- routing a portion of the make-up hydrogen through a conduit connecting the motor and the re-circulation loop.

* * * * *